United States Patent [19]

Olberding et al.

[11] Patent Number: 4,995,195
[45] Date of Patent: Feb. 26, 1991

[54] AUTOMATIC REAR WINDOW

[76] Inventors: Gordon D. Olberding, P.O. Box 95; Mahlon W. Shearer, HC 71, Box 33, both of Stuart, Nebr. 68780

[21] Appl. No.: 570,769

[22] Filed: Aug. 22, 1990

[51] Int. Cl.$^5$ ............................................. E05F 17/00
[52] U.S. Cl. ...................................... 49/118; 49/362; 49/380
[58] Field of Search ................. 49/118, 380, 362, 370, 49/360

[56] References Cited

U.S. PATENT DOCUMENTS

| | | | |
|---|---|---|---|
| 1,411,039 | 3/1922 | Lacey | 49/118 |
| 3,321,234 | 5/1967 | Harrell et al. | 49/370 X |
| 3,469,345 | 9/1969 | Hanks | 49/2 |
| 4,229,907 | 10/1980 | Hall | 49/362 |
| 4,322,914 | 4/1982 | McGaughey | 49/370 |
| 4,433,508 | 2/1984 | Carletta | 49/348 |
| 4,541,202 | 9/1985 | Dockery | 49/362 |
| 4,605,108 | 8/1989 | Monot | 49/362 X |
| 4,635,398 | 1/1987 | Nakamura | 49/370 X |
| 4,698,938 | 10/1987 | Huber | 49/118 X |
| 4,793,099 | 12/1988 | Friese et al. | 49/380 |
| 4,920,698 | 5/1990 | Friese et al. | 49/380 |

Primary Examiner—Philip C. Kannan
Attorney, Agent, or Firm—Henderson & Sturm

[57] ABSTRACT

An automatic rear window opener for a vehicle including a frame adapted to fit into the opening left by the removal of a standard rear window. The automatic rear window is operated by a reversible electric motor having a rotating output shaft extending from each side of the motor. Left and right-hand threaded shafts attached to the output shafts on opposite sides of the motor carry threaded brackets that simultaneously move in opposite directions when the motor is activated. A pair of movable central panes are attached one to each of the brackets and ride in a track that extends across the bottom portion of the frame. The entire drive mechanism is located in the frame below the track and the control switch is located conveniently within the vehicle cab.

2 Claims, 2 Drawing Sheets

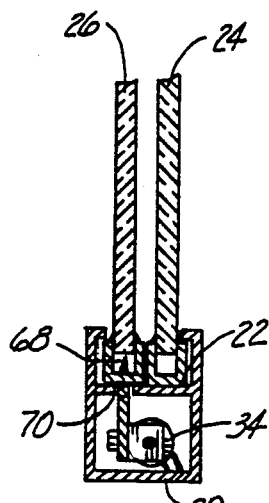
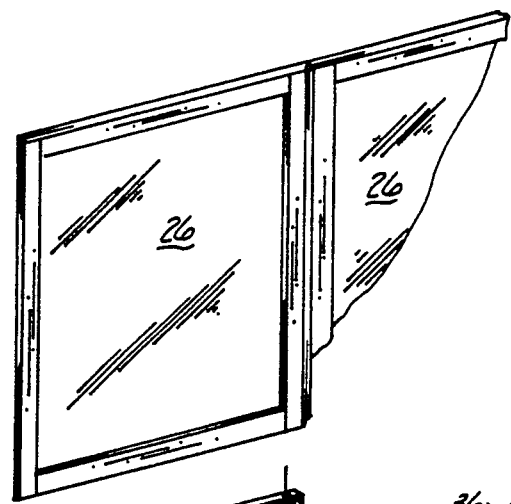
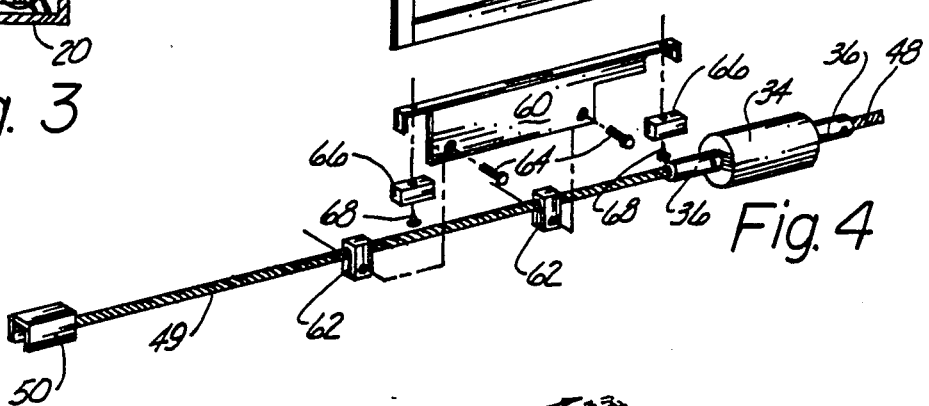
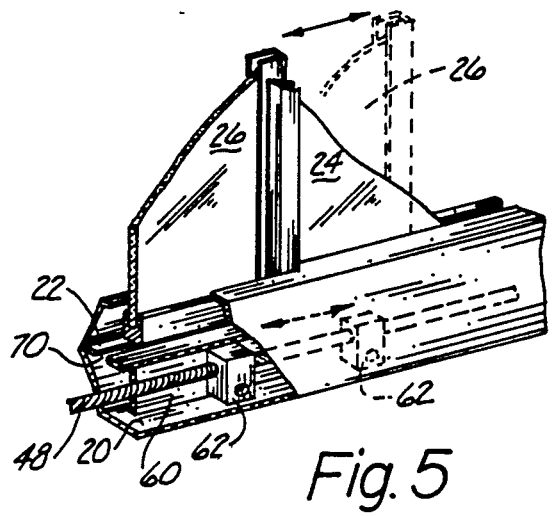
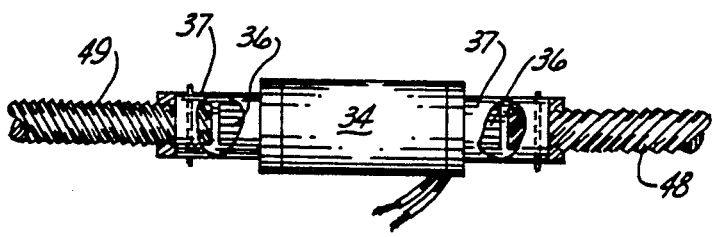

4,995,195

AUTOMATIC REAR WINDOW

TECHNICAL FIELD

This invention relates to vehicle windows, and more particularly, to an automatic rear window opener for a pickup truck.

BACKGROUND ART

Known rear window openers for pickup trucks have numerous practical limitations. Some require that a special opening be made in the cab to accommodate the unit. The work required to prepare the opening and install the unit results in an expensive option. Also, drive units are sometimes located remote from the window requiring complex linkages that take up scarce space in the pickup cab.

Those concerned with these and other problems recognize the need for an improved automatic rear window for a vehicle.

DISCLOSURE OF THE INVENTION

The present invention provides an automatic rear window opener for a vehicle including a frame adapted to fit into the opening left by the removal of a standard rear window. The automatic rear window is operated by a reversible electric motor having a rotating output shaft extending from each side of the motor. Left and right-hand threaded shafts attached to the output shafts on opposite sides of the motor carry threaded brackets that simultaneously move in opposite directions when the motor is activated. A pair of movable central panes are attached one to each of the brackets and ride in a track that extends across the bottom portion of the frame. The entire drive mechanism is located in the frame below the track and the control switch is located conveniently within the vehicle cab.

An object of the present invention is the provision of an improved automatic rear window for a vehicle.

Another object is to provide an automatic rear window that can be easily and quickly installed in the opening left by removal of a standard window.

A further object of the invention is the provision of an automatic rear window that is uncomplicated in design and inexpensive to manufacture.

Still another object is to provide an automatic rear window that is durable and inexpensive to maintain.

A still further object of the present invention is the provision of an automatic rear window having a drive located in the window frame.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 3 is an enlarged side elevation sectional view taken along line 3—3 of FIG. 2;

FIG. 4 is an exploded perspective view showing the components that interconnect the drive mechanism and the central window pane;

FIG. 5 is a partial perspective view showing the drive mechanism located below the track that carries the sliding central pane, the dashed line portion showing the central window pane and bracket moved to the right; and FIG. 6 is an enlarged partial rear elevational view showing the connection of the left-hand threaded shaft and right-hand threaded shaft to the output shafts extending to each side of the reversible motor.

BEST MODE FOR CARRYING OUT THE INVENTION

Figure 1:
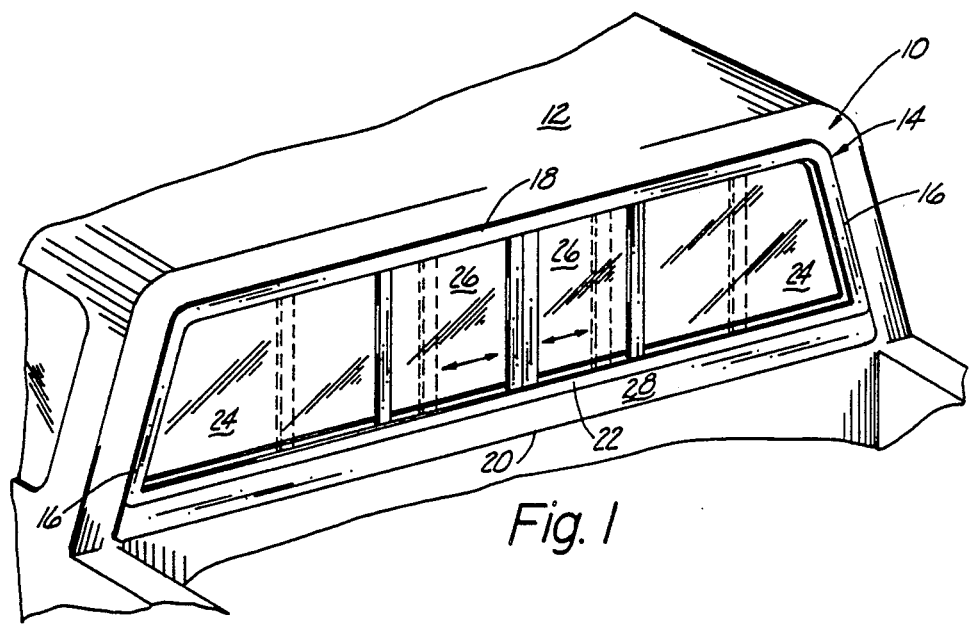
FIG. 1 is a partial perspective view showing the automatic rear window of the present invention installed in the opening left by the removal of a standard rear window, the dashed line portion showing the central window panes moved toward the open position.

Referring now to the drawings, wherein like reference numerals designate identical or corresponding parts throughout the several views, FIG. 1 shows the automatic rear window (10) of the present invention installed in the opening left by the removal of a standard rear window for the pickup truck (12). The automatic window (10) includes a frame (14) having lateral sides (16), a tope (18), and a bottom (20). A track (22) extends between the lateral sides (16) up about two inches from the bottom (20). A stationary side window pane (24) is located at each side of the frame (14) and a pair of movable central window panes (26) are supported on the track (22). The central panes (26) are movable as indicated by the directional arrows between an open position (dashed line) where the central panes (26) extend over the side panes (24), and a closed position (full line) where the central panes (26) abut one another.

Figure 2:
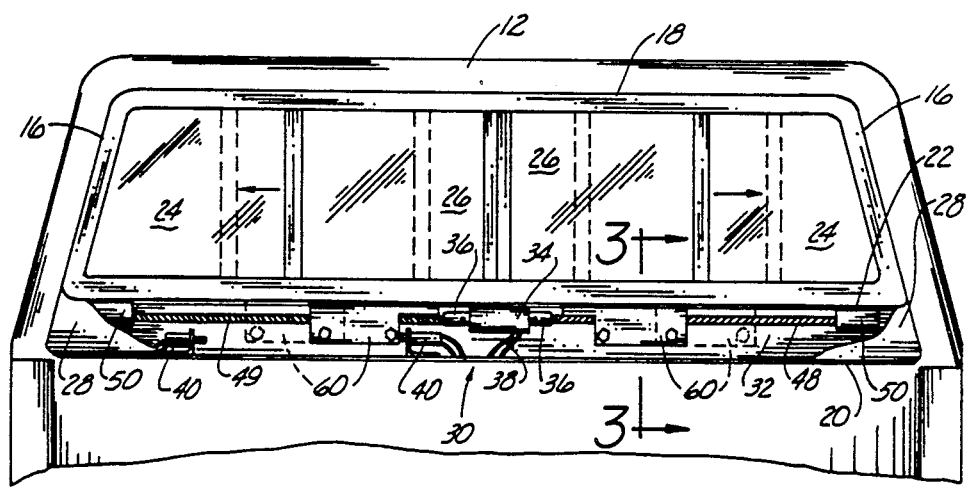
FIG. 2 is a rear elevational view of the rear window with portions of the housing cut away to show the drive mechanism for automatically opening and closing the central window panes.

As best shown in FIG. 2, a housing (28) covers the drive mechanism (30) enclosed in a cavity (32) formed between the frame bottom (20) and the track (22). The drive mechanism (30) includes a reversible electric motor (34) having rotatable output shafts (36) extending laterally from each side of the motor (34). The motor (34) is powered by electrical conducting wires (38) that are electrically connected to the vehicle's power supply and selectively activated by a control located in the vehicle passenger compartment. Limit switches (40) are positioned to deactivate the motor (34) and limit the travel of the central panes (26) to a predetermined range. Circuitry may be provided to automatically close the central panes (26) when the vehicle's ignition switch is turned off and/or to halt the closing process if an obstruction is placed between the central panes (26).

As shown in FIGS. 2 and 6, left-hand threaded shaft (48) has one end attached by a coupler (37) to the output shaft (36) on one side of the motor (34) and the other end supported by a pivot bearing (50). A right-hand threaded shaft (49) has one end attached to the output shaft (36) on the other side of the motor (34) and the other end carried by pivot bearing (50).

Referring now to FIGS. 2 and 4, brackets (60) are threadably attached to each of the threaded shafts (48, 49). The lower portion of each bracket (60) is attached to its corresponding shaft (48, 49) by a pair of threaded blocks (62) and fasteners (64). The upper portion of each bracket (60) is attached to its corresponding central pane (26) by clips (66) and fasteners (68). As seen by reference to FIGS. 3 and 5, the fasteners (68) extend up through a slot (20) in the track (22) so that the central pane (26) is simultaneously supported on the track (22)

and moved along the track (22) as the bracket (60) travels along the threaded shaft (48, 49).

In operation, the reversible electric motor is selectively activated by the vehicle operator to open or close the central window panes (26). As the output shafts (36) rotate, the brackets (60) simultaneously move in opposite lateral directions since one is threadably attached to a left-hand threaded shaft (48) and the other is threadably attached to a right-hand threaded shaft (49). When the central panes (26) reach the fully closed or fully opened position, limit switch (40) is contacted by the bracket (60) to deactivate the motor (34).

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

We claim:

1. An automatic rear window for a vehicle, comprising:
    a frame including lateral sides, a top, and a bottom;
    a track disposed between the top and the bottom of the frame and disposed to extend between the lateral sides of the frame;
    a stationary side window pane disposed at least lateral side of the frame between the track and the top;
    a pair of movable central window panes disposed in the frame between the track and the top adapted to simultaneously move on the track in opposite lateral directions between an open position wherein the central panes extend over the side panes, and a closed position wherein the central panes abut one another; and
    drive means for simultaneously moving the central panes in opposite lateral directions, the drive means being disposed below the track and including:
        a reversible electric motor operably connected to a power source in the vehicle, said motor being disposed in the frame below the track, said motor including rotating output shafts extending laterally from each side of the motor;
        means for selectively activating the motor; a left-hand threaded shaft having one end attached to the output shaft on one side of the motor and the other end journalled in a first support bearing;
        a right-hand threaded shaft having one end attached to the output shaft on the other side of the motor, and the other end journalled in a second support bearing;
        a first bracket having a lower portion threadably attached to the left-hand threaded shaft and an upper portion attached to one of the central panes; and
        a second bracket having a lower portion threadably attached to the right hand threaded shaft and an upper portion attached to the other of the central panes.

2. The automatic rear window of claim 1 further including a limit switch disposed below said track in a path of travel of one of said first bracket and second bracket wherein contact of the limit switch by one of the brackets deactivates the motor.

* * * * *